(12) United States Patent
Teboulle et al.

(10) Patent No.: US 12,146,810 B2
(45) Date of Patent: Nov. 19, 2024

(54) METHOD OF EVALUATING THE WEAR OF A TIRE

(71) Applicant: SAGEMCOM ENERGY & TELECOM SAS, Rueil Malmaison (FR)

(72) Inventors: Henri Teboulle, Rueil Malmaison (FR); Abbas Sabraoui, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 226 days.

(21) Appl. No.: 17/487,439

(22) Filed: Sep. 28, 2021

(65) Prior Publication Data

US 2022/0113223 A1 Apr. 14, 2022

(30) Foreign Application Priority Data

Oct. 8, 2020 (FR) ...................................... 2010275

(51) Int. Cl.
*G01M 17/02* (2006.01)
*B60C 11/24* (2006.01)
*B60C 23/04* (2006.01)
*B60C 19/00* (2006.01)

(52) U.S. Cl.
CPC .......... *G01M 17/02* (2013.01); *B60C 11/243* (2013.01); *B60C 11/246* (2013.01); *B60C 23/0486* (2013.01); *B60C 2019/004* (2013.01)

(58) Field of Classification Search
CPC .... G01M 17/02; B60C 11/243; B60C 11/246; B60C 23/0486; B60C 2019/004
See application file for complete search history.

(56) References Cited

U.S. PATENT DOCUMENTS

| 3,882,717 | A  | * | 5/1975  | McCauley | .......... G01M 17/025 |
|           |    |   |         |          | 73/900                 |
| 4,089,226 | A  | * | 5/1978  | Kraska   | .................... G01N 29/11 |
|           |    |   |         |          | 73/146                 |
| 5,249,460 | A  | * | 10/1993 | Dory     | .................... G01M 17/027 |
|           |    |   |         |          | 73/146                 |
| 8,009,027 | B2 | * | 8/2011  | Thomas   | ................ B60C 23/066 |
|           |    |   |         |          | 73/146                 |

(Continued)

FOREIGN PATENT DOCUMENTS

| DE | 10 2015 117024 A1 | 4/2017 |
| WO | WO 2008/061770 A1 | 5/2008 |
| WO | WO 2015/044443 A1 | 4/2015 |

*Primary Examiner* — Tarun Sinha
(74) *Attorney, Agent, or Firm* — MUNCY, GEISSLER, OLDS & LOWE, P.C.

(57) ABSTRACT

A wear evaluation method for evaluating the wear of a vehicle wheel tire (3) having a tread with a crown area, the method comprising the following measurement steps:

causing a transducer (1) positioned on the vehicle in the proximity of the tire (3) to emit a first ultrasonic signal (S1);

acquiring an electrical measurement signal produced by said transducer when it receives a second ultrasound signal (S2) resulting from the first ultrasonic signal being reflected by a metal target (4) incorporated in the thickness of the crown area of the tire;

measuring at least one parameter of the electrical measurement signal;

evaluating the wear of the tire from said parameter.

20 Claims, 3 Drawing Sheets

(56) References Cited

U.S. PATENT DOCUMENTS

2003/0050743 A1\* 3/2003 Caretta ................... B60T 8/241
 701/1
2021/0237896 A1\* 8/2021 Bill ......................... H04W 4/38

\* cited by examiner

METHOD OF EVALUATING THE WEAR OF A TIRE

The invention relates to the field of monitoring the tires of a vehicle.

BACKGROUND OF THE INVENTION

The wear of a car wheel tire is generally evaluated by inspecting (by eye or by touch) wear indicators that are situated in the grooves of the tire tread. That method thus requires human intervention.

Some people do not know how to do this, or else people forget to verify the state of their tires regularly, which increases the risk of an accident. Furthermore, and more generally, monitoring operations that are entrusted to users are unreliable.

Proposals have thus been made to measure the level of wear of a tire automatically and without any human intervention.

In order to evaluate the stress state of a tire automatically, one prior art solution consists in positioning a piezoelectric sensor (e.g. a piezoelectric cable) on an inside surface of the tire, in analyzing the signal received by the piezoelectric sensor continuously and also of frequency, and in evaluating the stress state of the tire on the basis of that analysis.

That solution does not enable the wear of the tire to be estimated directly. Furthermore, having the piezoelectric sensor positioned inside the tire makes it necessary to set up wireless communication between a rotary part (the wheel) and a non-rotary part (the remainder of the car) in order to transmit measurements, and also makes it necessary to provide power supply means (e.g. a battery) inside the tire or the wheel in order to power the piezoelectric sensor.

That arrangement is thus both expensive and complicated to design (and to maintain).

OBJECT OF THE INVENTION

An object of the invention is to measure the level of wear of a vehicle wheel tire automatically and in a manner that is simple and inexpensive.

SUMMARY OF THE INVENTION

In order to achieve this object, there is provided a wear evaluation method for evaluating the wear of a vehicle wheel tire having a tread with a crown area, the method comprising the following measurement steps:

causing a transducer positioned on the vehicle in the proximity of the tire to emit a first ultrasonic signal;
acquiring an electrical measurement signal produced by said transducer when it receives a second ultrasound signal resulting from the first ultrasonic signal being reflected by a metal target incorporated in the thickness of the crown area of the tire;
measuring at least one parameter of the electrical measurement signal;
evaluating the wear of the tire from said parameter.

The evaluation method of invention thus makes it possible to evaluate the wear of a tire automatically and dynamically without incorporating in the tire or in the wheel any sensor that needs to be powered or any wireless communication means.

There is also provided a wear evaluation method as described above wherein the metal target is incorporated in the thickness of the tread of the tire.

There is also provided a wear evaluation method as described above wherein the metal target forms part of tire reinforcement that is situated in the crown area under the tread.

There is also provided a wear evaluation method as described above wherein the measurement steps are performed after the vehicle is started following a period during which the vehicle has been stopped for not less than a predetermined duration.

There is also provided a wear evaluation method as described above wherein the measurement steps are performed when the wheel on which the tire is fitted is straight.

There is also provided a wear evaluation method as described above including acquiring information about the angular position of steering control means of the vehicle in order to determine whether the wheel is, or is not, straight.

There is also provided a wear evaluation method as described above further comprising the steps of acquiring an estimate of tire inflation pressure, of verifying whether the inflation pressure is normal, and of invalidating the evaluation of tire wear if the inflation pressure is abnormal.

There is also provided a wear evaluation method as described above wherein the measurement steps are performed with an inner transducer mounted at an inner side of the tire relative to the vehicle, and with an outer transducer mounted at an outer side of the tire.

There is also provided a wear evaluation method as described above comprising the steps of using the inner transducer to produce a first evaluation of the wear at the inner side of the tire and of using the outer transducer to produce a second evaluation of the wear at the outer side of the tire, and then of detecting the presence or the absence of proper alignment on the basis of the first and second evaluations of wear.

There is also provided on-board equipment arranged to be incorporated in a vehicle and to be connected to at least one transducer, the equipment comprising a processor component arranged to perform the wear evaluation method as described above There is also provided a measurement system comprising a transducer and on-board equipment as described above.

There is also provided a measurement system as described above, including an inner transducer arranged to be mounted at an inner side of a tire relative to the vehicle, and an outer transducer arranged to be mounted at an outer side of the tire.

There is also provided a computer program including instructions that cause the processor component of the on-board equipment as described above to execute the steps of the wear evaluation method as described above.

There is also provided a computer readable storage medium storing the computer program as described above.

The invention can be better understood in the light of the following description of particular, nonlimiting implementations of the invention.

BRIEF DESCRIPTION OF THE DRAWINGS

Reference is made to the accompanying drawings, in which.

DETAILED DESCRIPTION OF THE INVENTION

In a first implementation, the wear evaluation method is performed in a car that has four wheels.

Figure 1:
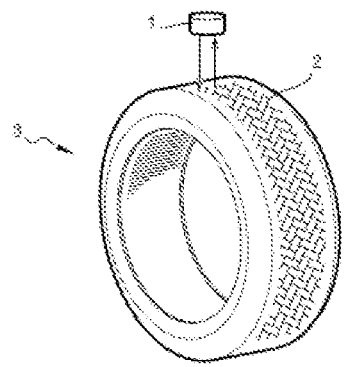
FIG. 1 shows a transducer and a perspective view of a tire.

With reference to FIG. 1 and in this example, a respective transducer 1 is mounted on the outside surface of each wheel well for each wheel, above the corresponding wheel. The transducer 1 is a piezoelectric transducer. The transducer 1 faces the tread 2 of the tire 3 that is mounted on said wheel.

The tire 3 incorporates at least one metal target that is integrated in the thickness of the crown area of the tire 3. In this example, the tire 3 has a plurality of metal targets, which are specifically metal plates 4, each of which is incorporated in the thickness of the tread 2. Each metal plate 4 is centered across the width of the tread 2 and it extends perpendicularly to a radial direction passing through the center of the tire 3 and the center of said metal plate 4. The metal plates 4 are distributed regularly around the tread 2. By way of example, each metal plate 4 is about 10 centimeters (cm) long and is made out of aluminum.

On-board equipment is incorporated in the car and is connected to the four transducers 1 that are associated with the four tires 3.

In this example, the on-board equipment comprises calculation means connected to the on-board computer. The calculation means include a processor module comprising a processor component that is adapted to execute instructions of a program for performing the wear evaluation method of the invention. The program is stored in a memory connected to or incorporated in the processor component. By way of example, the processor component may be a processor, a digital signal processor (DSP), a microcontroller, or indeed a programmable logic circuit such as a field programmable gate array (FPGA) or an application specific integrated circuit (ASIC).

Figure 2:
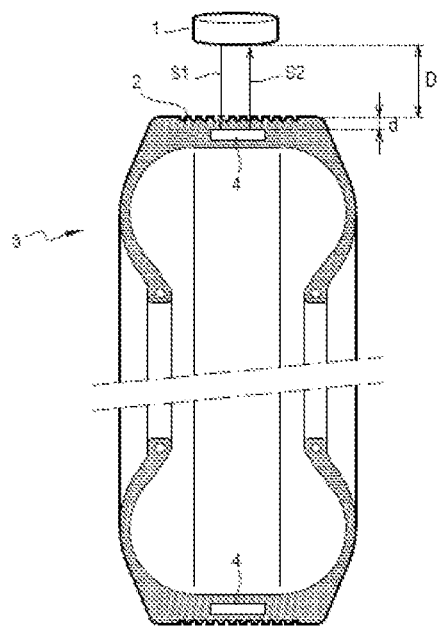
FIG. 2 shows the transducer and a view of the tire in section on a vertical plane containing the axis of rotation of the tire.

With reference to FIG. 2, the wear evaluation method consists, for each tire 3, in emitting a first ultrasonic signal S1 via the associated transducer 1, in receiving, via said transducer 1, a second ultrasonic signal S2 resulting from the first ultrasonic signal S1 being reflected by one of the metal plates 4 incorporated in the tread 2 of said tire 3, and then in producing an estimate of the wear of the tire 3 on the basis of the second ultrasonic signal S2. The ultrasonic wave thus travels twice along a distance D through air, and in particular, twice along a distance d inside the tire 3.

The greater the distance d, i.e. the greater the thickness of the tread 2 between its crown and the metal plate 4, the greater the extent to which the first ultrasonic signal S1 and the second ultrasonic signal S2 are absorbed, and thus the lower the level of the reflection or "echo" from the metal plate 4. Thus, at a given ambient temperature, the higher the level of the echo, the greater the extent to which the tire 3 is worn. In order to focus the first ultrasonic signal S1 sufficiently on the tread 2 of the tire 3, it is advantageous to make use of a transducer 1 that has a diameter that is relatively large. In this example, the diameter of the transducer 1 lies in the range 2 cm to 3 cm.

It should be observed that the section view of FIG. 2 is a highly simplified view of the tire showing the tread 2 (having the metal plates 4 incorporated therein), but not showing the other elements of the crown area (crown reinforcement, casing reinforcement, etc.).

Figure 3:
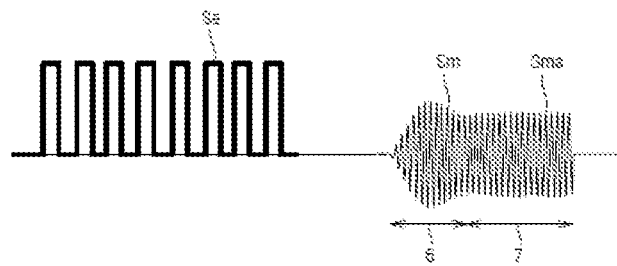
FIG. 3 shows an electrical excitation signal and an electrical measurement signal obtained from a tire that is not worn.
Figure 4:
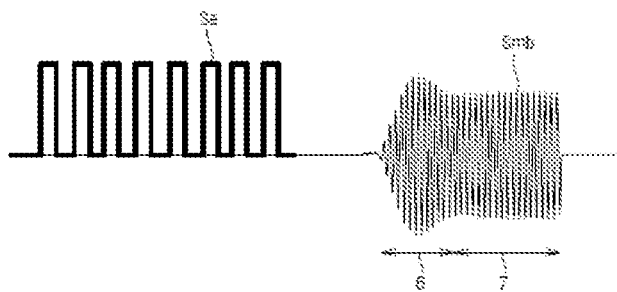
FIG. 4 shows an electrical excitation signal and an electrical measurement signal obtained from a tire that is worn.

With reference to FIGS. 3 and 4, the processor component thus begins by producing an electrical excitation signal Se (a square wave signal in this example), and causes the transducer 1 to emit the first ultrasonic signal S1 by applying the electrical excitation signal Se to the terminals of the transducer 1.

By way of example, the electrical excitation signal Se (and thus both the first ultrasonic signal S1 and the second ultrasonic signal S2) comprises twenty lobes (i.e. potentially fewer than shown in FIGS. 3 and 4).

It is known that the lower the ultrasonic frequency, the smaller its attenuation in air. The excitation frequency of the transducer 1, i.e. the frequency of the electrical excitation signal Se (and thus of the first ultrasonic signal S1 and of the second ultrasonic signal S2) is thus selected to be relatively low. By way of example, the excitation frequency may lie in the range 40 kilohertz (kHz) to 500 kHz.

Thereafter, the processor component acquires an electrical measurement signal Sm. The electrical measurement signal Sm is produced by the transducer 1 when it receives the second ultrasonic signal S2.

This operation is repeated a certain number of times over a given measurement period, which may be equal to 100 milliseconds (ms), for example. Each measurement period typically comprises ten measurements (i.e. the processor component causes the first ultrasonic signal S1 to be emitted ten times and it acquires the electrical measurement signal Sm corresponding to the second ultrasonic signal S2 ten times).

While the wheel is rotating, the transducer 1 is not continuously facing a metal plate 4, so among the first ultrasonic signals S1 emitted during the measurement period, some of them are not reflected by a metal plate 4 but pass through a portion of the tread 2 that lies between two metal plates 4, such that the associated second ultrasonic signals S2 and thus the associated electrical measurement signals Sm are relatively small in amplitude.

Thus, during each measurement period, whenever the amplitude of an electrical measurement signal Sm is less than a predetermined working threshold, the processor component does not make use of said electrical measurement signal Sm. In contrast, whenever the amplitude of an electrical measurement signal Sm is greater than or equal to the predetermined working threshold, the processor component considers that the second ultrasonic signal S2 from which the electrical measurement signal Sm is derived does indeed result from the first ultrasonic signal S1 being reflected by one of the metal plates 4, and it makes use of the electrical measurement signal Sm.

For each electrical measurement signal Sm that is usable, the processor component measures at least one parameter of the electrical measurement signal Sm that is representative of the wear of the tire 3.

In this example, the parameter is one of the amplitudes of the electrical measurement signal Sm. In FIGS. 3 and 4, it can be seen that each electrical measurement signal Sm comprises a preliminary signal portion 6 and a working signal portion 7. In the preliminary signal portion 6, the amplitude of the electrical measurement signal Sm increases considerably and then decreases. In the working signal portion 7, the amplitude of the electrical measurement signal Sm is relatively constant. When the first ultrasonic signal S1 comprises twenty lobes, the preliminary signal portion 6 typically has five or six lobes.

In this example, the amplitude of the electrical measurement signal Sm is greater in the preliminary signal portion 6, which is due to the fact that the excitation frequency of the transducer 1 does not correspond exactly to its resonant frequency. Naturally, an excitation frequency could have been selected that is equal to the resonant frequency of the transducer 1.

In this example, the amplitude of the electrical measurement signal Sm that is taken into account is the amplitude of the working signal portion 7. By way of example, this amplitude may be equal to the mean amplitude of the lobes of the working signal portion 7, or it may be equal to the amplitude of a predetermined lobe in the electrical measurement signal Sm lying within the working signal portion 7. By way of example, when the first ultrasonic signal S1 has twenty lobes, the predetermined lobe is the tenth lobe of the electrical measurement signal Sm.

FIG. 3 shows an electrical measurement signal Sma when the wear of the tire 3 is very low, and FIG. 4 shows an electrical measurement signal Smb when the wear of the tired 3 is relatively large. It can be seen that the amplitude of the electrical measurement signal Smb is greater.

The processor component thus compares the amplitude of the electrical measurement signal Sm with at least one predetermined monitoring threshold. Naturally, if, during the measurement period, a plurality of electrical measurement signals Sm are used, the amplitude in question may be obtained from the amplitudes of a plurality of electrical measurement signals Sm (and may for example be equal to the mean of said amplitudes).

When the amplitude of the electrical measurement signal Sm becomes greater than the predetermined monitoring threshold, a warning is generated automatically to warn the driver of the car about the wear state of the tire 3.

In this example, three predetermined monitoring thresholds are configured in the processor component.

When the amplitude of the electrical measurement signal Sm becomes greater than a first predetermined monitoring threshold, low wear of the tire 3 is detected, and a first warning message is sent to the on-board computer.

When the amplitude of the electrical measurement signal Sm becomes greater than a second predetermined monitoring threshold (which is greater than the first predetermined threshold), medium wear of the tire 3 is detected, and a second warning message is sent to the on-board computer.

The first and second warning messages are not necessarily transmitted directly to the driver. The first and second warning messages seek to implement preventative maintenance and/or predictive maintenance, so as to anticipate wear becoming problematic and so as to change the tire before it is found to be in a wear state that is potentially dangerous.

When the amplitude of the electrical measurement signal Sm becomes greater than a third predetermined monitoring threshold (which is greater than the second predetermined threshold), severe wear of the tire 3 is detected, and a third warning message is sent to the on-board computer. The third warning message is transmitted directly to the driver, prompting immediate maintenance and thus an immediate change of the tire.

It is preferable to take measurements while the wheel is straight, so that the transducer 1 is indeed positioned facing the tread 2 of the tire 3.

It is also known that the state of the tire 3, which may be wet or dry to a greater or lesser extent, and which may be hot or cold to a greater or lesser extent, has an impact on the level with which the ultrasonic wave is absorbed and on the level with which it is reflected.

However, while the car is running, the tire 3 heats up and its temperature is unknown. The wet or dry state of the tire 3 is likewise unknown. These parameters are therefore not easy to compensate.

Consequently, in order to avoid the state of the tire 3 having too great an impact on the estimated wear of the tire 3, wear measurement is performed when the car is started following a period during which the car has been stopped for a sufficient length of time. Thus, the temperature of the tire 3 is equal to ambient temperature (which is known) and the state of the road surface has no impact on the measurement. The way in which reflection takes place at this temperature is known and well understood.

The processor component thus performs the above-described measurement steps after the vehicle is started following a period during which the vehicle has been stopped for not less than a predetermined duration. In this example, the predetermined duration is equal to one hour.

Furthermore, the processor component performs the measurement steps while the wheel on which the tire 3 is mounted is straight.

Figure 5:
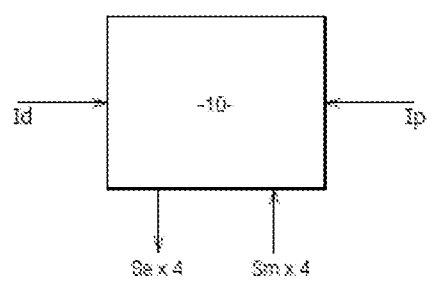
FIG. 5 shows a processor component in which the wear evaluation method of the invention is performed.

With reference to FIG. 5, the processor component 10 produces the electrical excitation signal Se for each of the four transducers 1, and applies it to the terminals of each transducer 1 (so that it generates the first ultrasonic signal S1), and receives an electrical measurement signal Sm (resulting from each transducer 1 receiving the second ultrasonic signal S2).

The processor component 10 also acquires information Id relating to starting, thereby enabling it, at the time of starting, to determine the length of time during which the car has been stopped before starting.

The processor component 10 also acquires information Ip about the angular position of the steering wheel of the car, thereby enabling it to determine whether or not the wheel is straight.

Figure 6:
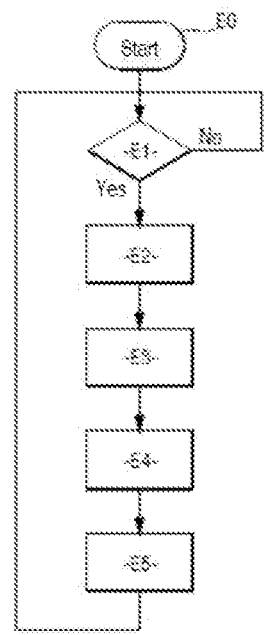
FIG. 6 shows steps in the wear evaluation method of the invention.

The above is summarized by the flowchart of FIG. 6.

The method of evaluating wear starts (step E0). The processor component 10 waits for the car to start after it has been stopped for at least one hour (step E1). So long as such a car start does not occur, the method returns to step E1.

When such a car start does occur, the processor component 10 waits for the steering wheel to be straight (step E2).

When that occurs, the processor component 10 performs the measurement steps. The processor component 10 generates and applies the electrical excitation signal Se to the terminals of each transducer 1 so that it generates the first ultrasonic signal S1, and then receives the electrical measurement signal Sm associated with the second ultrasonic signal S2, and measures the amplitude of the electrical measurement signal Sm (e.g. the amplitude of the tenth lobe), which amplitude is representative of the wear of each of the tires associated with the transducers (step E3).

For each tire, the processor component compares the amplitude of the electrical measurement signal Sm with each of the three predetermined monitoring thresholds (step E4), and, where necessary, then produces one or more appropriate warning messages (step E5). Each warning message includes an identifier for the tire in question. The wear evaluation method then returns to step E1.

Advantageously, for each tire, at the time of a "pertinent" car start (i.e. a start following a stop of at least one hour), the processor component acquires an estimate of the inflation pressure of the tire at the time of said start, verifies whether the inflation pressure is normal, and invalidates its evaluation of the wear of the tire if the inflation pressure is abnormal. A "normal" inflation pressure corresponds to an inflation pressure lying within a predetermined normal pressure range.

It should be observed that provision may be made for the driver to initiate self-calibration each time new tires are fitted so that a reference curve is determined for ultrasonic echoes.

By way of example, self-calibration may consist in specifying the type of the tires that have been fitted. The type that is specified may consist in distinguishing between tires made of soft rubber and tires made of hard rubber.

The predetermined monitoring thresholds are then defined as a function of the type of the tires. Naturally, these predetermined monitoring thresholds also depend on the voltage of the electrical excitation signal Se. The excitation voltage (i.e. the maximum amplitude of the electrical excitation signal Se) is constant in this example, and may have any value, e.g. lying in the range 1 volt (V) to 100 V. The excitation voltage is typically equal to 12 V.

Naturally, the invention may also be applied to vehicles that are already on the road. At the time the measurement system is incorporated in the vehicle, provision may be made to perform self-calibration with the existing tires.

It should also be observed that the positioning of the front and rear shock absorbers has little influence on measurement, since it is in the rubber of the tire where most of the attenuation occurs (and indeed much the greatest part of the attenuation, such that the effect of attenuation in air is negligible).

Figure 7:
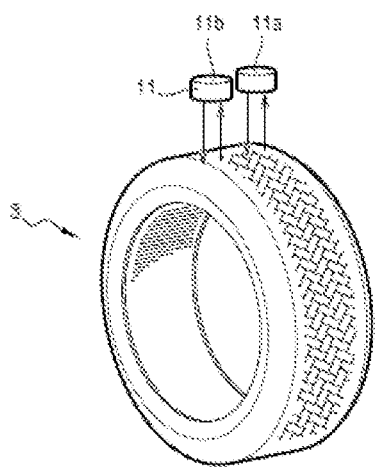
FIG. 7 is a figure similar to FIG. 1, with an inner transducer and an outer transducer.

With reference to FIG. 7, the wear evaluation method in a second implementation of the invention is performed in a measurement system that has two transducers 11 per tire 3, instead of only one. The two transducers 11 are piezoelectric transducers.

The two transducers 11 associated with a tire 3 comprise an inner transducer 11a mounted at the inner side of the tire 3 relative to the car, and an outer transducer 11b mounted at the outer side of the tire 3.

For each tire 3, the above-described measurement steps are performed using the inner transducer 11a and then using the outer transducer 11b (or vice versa).

Respective echoes are thus generated at the inner and outer edges of the crown area of the tire 3. A first evaluation is thus produced for the wear on the inner side of the tire 3 while using the inner transducer 11a, and a second evaluation is produced for the wear on the outer side of the tire 3 while using the outer transducer 11b.

On the basis of the first and second evaluations of wear, if the wear is asymmetrical, the processor component can thus detect that the tires are not properly aligned.

Naturally, the invention is not limited to the embodiments described, but covers any variant coming within the ambit of the invention as defined by the claims.

Above, each of the tires for which wear is measured has metal plates incorporated in its tread. The metal plates need not necessarily be plane, and they could present some other shape, e.g. rounded. It is possible to use a single plate that extends all around the tread. The shape of the metal target need not necessarily be flat.

The metal target(s) need not necessarily be extra material that is incorporated in the tread of the tire. The metal target may form part of tire reinforcement that is situated in the crown area under the tread. This solution is most advantageous, since the wear evaluation method can then be performed using tires that are conventional, i.e. that do not have special characteristics solely for the purpose of performing the invention.

The configuration described above for performing the wear evaluation method of the invention is highly "centralized". In that configuration, it is the calculation means incorporating the processor component that generate the electrical excitation signals that are transmitted to the transducers, and that acquire the electrical measurement signals. It is naturally possible to envisage another configuration that is more "distributed". For example, a respective "remote" electronic unit may be positioned in the proximity of each transducer. Such an electronic unit may produce the electrical excitation signals, apply them to the terminals of the transducer, acquire the electrical measurement signals, and measure the amplitudes of the electrical measurement signals. Such an electronic unit may then itself detect tire wear that is abnormal and produces a warning, or else it may transmit the amplitudes of the electrical measurement signals to a centralized processor component that undertakes such analysis for all of the tires.

The invention may naturally be performed with tires for wheels of any type of vehicle: car, motorbike, aircraft, etc.

The invention claimed is:

1. A wear evaluation method for evaluating the wear of tire tread on a vehicle wheel tire, the method comprising the following measurement steps:
   causing a transducer positioned on the vehicle in a proximity of the vehicle wheel tire to emit a first ultrasonic signal;
   acquiring an electrical measurement signal produced by said transducer when it receives a second ultrasonic signal resulting from the first ultrasonic signal being reflected by a metal target incorporated in a thickness of a crown area of the vehicle wheel tire;
   measuring at least one parameter of the electrical measurement signal; and
   evaluating the wear of the tire tread on the vehicle wheel tire from said parameter.

2. The wear evaluation method according to claim 1, wherein the metal target is incorporated in a thickness of a tread of the vehicle wheel tire.

3. The wear evaluation method according to claim 1, wherein the metal target forms part of tire reinforcement that is situated in the crown area under a tread of the vehicle wheel tire.

4. The wear evaluation method according to claim 1, wherein the measurement steps are performed after the vehicle is started following a period during which the vehicle has been stopped for not less than a predetermined duration.

5. The wear evaluation method according to claim 1, wherein the measurement steps are performed when a wheel on which the vehicle wheel tire is fitted is straight.

6. The wear evaluation method according to claim 5, further comprising acquiring information about an angular position of steering control means of the vehicle in order to determine whether the wheel is, or is not, straight.

7. The wear evaluation method according to claim 1, further comprising the steps of acquiring an estimate of tire inflation pressure, of verifying whether the inflation pressure is normal, and of invalidating the evaluation of tire wear if the inflation pressure is abnormal.

8. The wear evaluation method according to claim 1, wherein the measurement steps are performed with an inner transducer mounted at an inner side of the tire relative to the vehicle, and with an outer transducer mounted at an outer side of the vehicle wheel tire.

9. The wear evaluation method according to claim 8, further comprising the steps of using the inner transducer to produce a first evaluation of the wear at the inner side of the tire and of using the outer transducer to produce a second evaluation of the wear at the outer side of the tire, and then of detecting the presence or the absence of proper alignment on the basis of the first and second evaluations of wear.

10. On-board equipment arranged to be incorporated in a vehicle and to be connected to at least one transducer, the equipment comprising a processor component arranged to perform the wear evaluation method according to claim 1.

11. A measurement system comprising a transducer and on-board equipment according to claim 10.

12. The measurement system according to claim 11, including an inner transducer arranged to be mounted at an inner side of a tire relative to the vehicle, and an outer transducer arranged to be mounted at an outer side of the tire.

13. A computer program including instructions that cause the processor component of the on-board equipment according to claim 10 to execute the steps of the wear evaluation method.

14. A computer readable storage medium storing the computer program according to claim 13.

15. A non-transitory, computer-readable storage medium storing instructions configured for execution by a computer to perform the wear evaluation method recited in claim 1.

16. The wear evaluation method according to claim 1, wherein the wear of the vehicle wheel tire comprises a reduction of depth of the crown area of the vehicle wheel tire.

17. The wear evaluation method according to claim 1, wherein the transducer is mounted on the vehicle in the proximity of the vehicle wheel tire.

18. The wear evaluation method according to claim 1, wherein the transducer is mounted on an outside surface of a wheel well of the vehicle wheel tire.

19. The wear evaluation method according to claim 1, wherein the transducer is mounted on the vehicle in the proximity of the vehicle wheel tire while the vehicle is in motion.

20. A wear evaluation method for evaluating the wear of a vehicle wheel tire, the method comprising the following measurement steps:
  causing a transducer positioned on the vehicle in a proximity of the vehicle wheel tire to emit a first ultrasonic signal;
  acquiring an electrical measurement signal produced by said transducer when it receives a second ultrasonic signal resulting from the first ultrasonic signal being reflected by a metal target incorporated in a thickness of a crown area of the vehicle wheel tire;
  measuring at least one parameter of the electrical measurement signal;
  evaluating the wear of the vehicle wheel tire from said parameter;
  using an inner transducer to produce a first evaluation of the wear at the inner side of the tire; and
  using an outer transducer to produce a second evaluation of the wear at the outer side of the tire.

* * * * *